A. DESORMEAU & D. M. DAYTON.
TOOL.
APPLICATION FILED NOV. 18, 1913.
1,121,900. Patented Dec. 22, 1914.
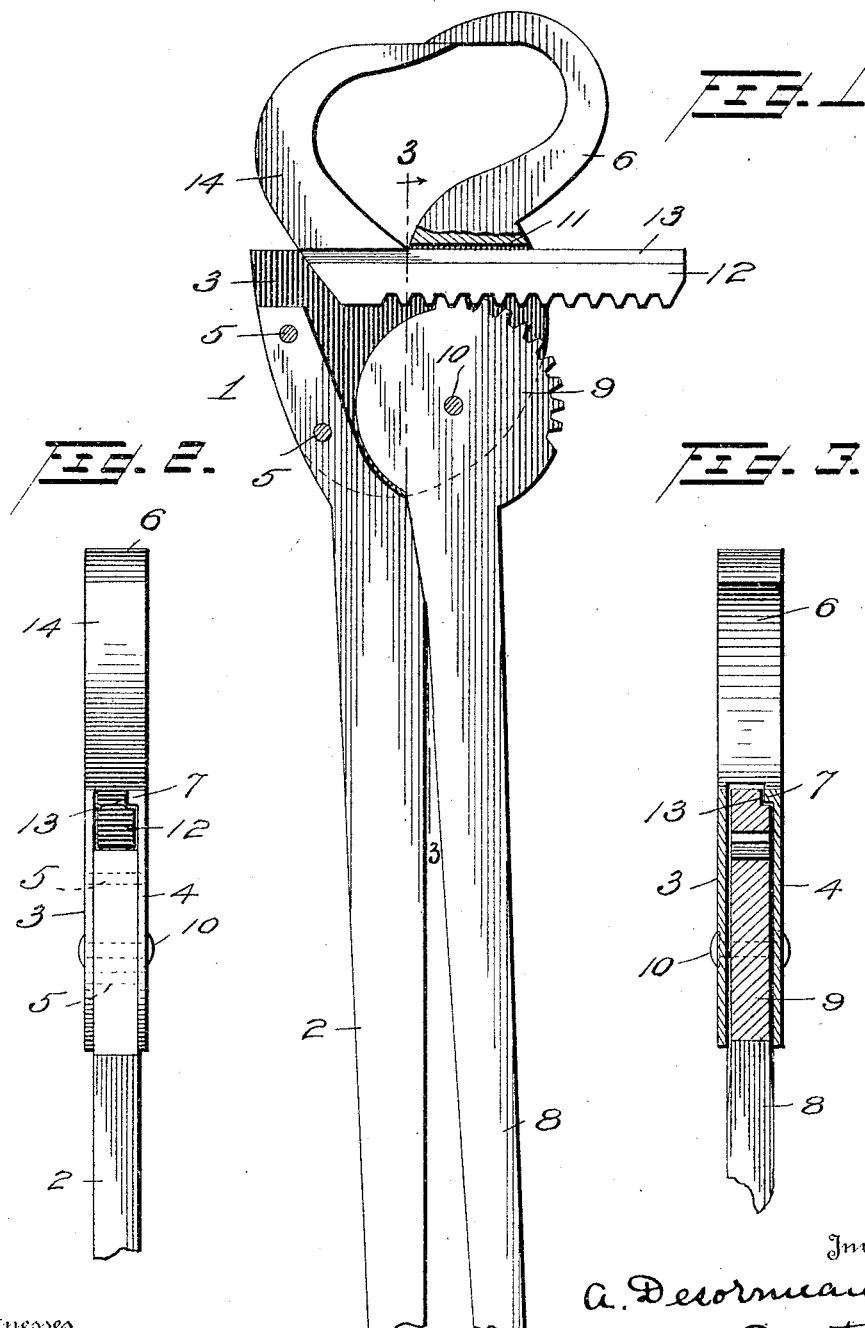

UNITED STATES PATENT OFFICE.

ADOLPHUS DESORMEAU AND DARCY M. DAYTON, OF TOWER, MICHIGAN.

TOOL.

1,121,900.   Specification of Letters Patent.   Patented Dec. 22, 1914.

Application filed November 18, 1913. Serial No. 801,630.

*To all whom it may concern:*

Be it known that we, ADOLPHUS DESORMEAU and DARCY M. DAYTON, citizens of the United States, residing at Tower, in the county of Cheboygan and State of Michigan, have invented new and useful Improvements in Tools, of which the following is a specification.

Our present invention pertains to tools; and it consists in the peculiar construction, relative arrangement and adaptation of parts whereby one working member of a tool may be moved in the handle of another working member and toward and from the latter working member in a powerful manner.

The invention will be fully understood from the following description and claim when the same are read in connection with the drawings, accompanying and forming part of this specification, in which:

Figure 1 is a view of the tool or implement embodying our invention, with one of the side plates of the body removed. Fig. 2 is a detail edge elevation of the tool. Fig. 3 is a detail transverse section, taken in the plane indicated by the line 3—3 of Fig. 1, looking toward the right.

Similar numerals of reference designate corresponding parts in all of the views of the drawing.

In furtherance of our invention, we have the body of the tool or implement comprise an intermediate portion 1 formed integral with a handle 2, and side plates 3 and 4 fixed with respect to the said intermediate portion 1 through the medium of transverse rivets 5 or other suitable means. The portions of the side plates 3 and 4 that extend beyond the intermediate portion 1 are spaced apart, and the side plate 4 is provided at its outer end and at one side of a working member 6 with a retaining flange 7, Figs. 2 and 3. The working member 6 which may be of any type desired is formed integral with and carried by the two side plates as shown in Fig. 3.

In addition to the handle 2 the tool comprises a handle 8 movable toward and from said handle 2. The handle 8 terminates at one end in a gear sector 9 which is disposed between the plates 3 and 4 and is pivotally connected thereto at the point 10.

Disposed and movable rectilinearly between the edge of the gear sector 9 and the base 11 of the working member 6 is a rack 12 that is intermeshed with and actuatable by the said gear sector. It will also be noticed that the said rack 12 is provided with a longitudinal recess 13 in which the flange 7 is disposed to guide the rack in its rectilinear movements and hold it against lateral or other casual movement. It will further be noted that on its movement toward the left in Fig. 1 the rack 12 bears on and is supported by the upper end of the intermediate body portion 1.

Formed integral with or otherwise fixed with respect to the rack 12 is a working member 14 that is opposed to and is adapted to coöperate with the working member 6. Like the working member 16 the member 14 may be of any description compatible with the purpose of our invention without involving departure from the scope of the same as claimed.

Our invention resides in the means disclosed for powerfully moving one working member of a tool relative to another working member thereof, and in the operation of said means it will be manifest that on movement of the handle 8 toward the handle 2, the member 14 will be moved toward the member 6, and the operator enabled to exert great leverage on the said member 14; also, when the handle 8 is moved in a direction away from the handle 2, the working member 14 will be moved away from the member 6, so as to fit the tool for application to another piece of work.

It will be manifest from the foregoing that our tool is simple and inexpensive in construction, and that when the handle 8 is manipulated to powerfully move the working member 14 inward, the rack 12 will be guided between and strongly reinforced by the base 11 of the working member 6, the gear sector 9 and the side plates 3 and 4. It will also be manifest from the foregoing that our tool embodies but few parts, and that all of said parts are well adapted to withstand the rough usage to which tools are ordinarily subjected.

Having described our invention, what we claim and desire to secure by Letters-Patent, is:

A tool consisting essentially of a body having an intermediate portion and an integral handle thereon; side plates fixed to opposite sides of and projecting beyond the outer end and inner edge of said intermediate portion, one of said side plates having an inwardly directed flange at its outer edge, extending at a right angle to the greatest length of the tool and arranged in a plane parallel to and forward of the plane of the outer end of said intermediate portion; a working member the base of which is integral with and joins the said side plates; a handle terminating at one end in a gear-sector and having said sector pivoted between the said side plates of the body and opposed to the inner edge of the said intermediate portion of the body; a rectilinearly movable rack confined between the base of said working member and the gear sector and movable against and parallel to the outer end of the intermediate portion of the body and intermeshed with the gear sector and having a longitudinal recess in one side receiving the said flange of the side plate; and a working member fixed with respect to and movable with the said rack.

In testimony whereof we have hereunto set our hands in presence of two subscribing witnesses.

ADOLPHUS DESORMEAU.
DARCY M. DAYTON.

Witnesses:
 ALMA M. JOHNSON,
 LOUIS W. HARMAN.

Copies of this patent may be obtained for five cents each, by addressing the "Commissioner of Patents, Washington, D. C."